United States Patent [19]  [11] 3,986,978
Michalko  [45] Oct. 19, 1976

[54] METHOD OF PREPARING SPHEROIDAL SILICA-ALUMINA PARTICLES

[75] Inventor: Edward Michalko, Chicago, Ill.

[73] Assignee: Universal Oil Products Company, Des Plaines, Ill.

[22] Filed: Dec. 17, 1974

[21] Appl. No.: 533,579

[52] U.S. Cl. .............................. 252/317; 252/448
[51] Int. Cl.² ........................................ B01J 13/00
[58] Field of Search ............................ 252/317, 448

[56] References Cited
UNITED STATES PATENTS

| | | |
|---|---|---|
| 2,408,986 | 10/1946 | Marisic et al. ............... 252/317 X |
| 2,477,695 | 8/1949 | Kimberlin, Jr. ............... 252/317 X |
| 2,900,349 | 8/1959 | Schwartz ..................... 252/317 |
| 3,183,194 | 5/1965 | Kuwata et al. ................ 252/317 |

Primary Examiner—Richard D. Lovering
Attorney, Agent, or Firm—James R. Hoatson, Jr.; Robert W. Welch; William H. Page, II

[57] ABSTRACT

An insoluble basic aluminum sulfate characterized by an $SO_3/Al_2O_3$ mole ratio of from about 0.6 to about 0.4 and a particle size of from about 1 to about 10 microns is commingled with acidic silica sol to form a stable suspension which is convertible to spheroidal particles by the oil-drop method.

5 Claims, No Drawings

METHOD OF PREPARING SPHEROIDAL SILICA-ALUMINA PARTICLES

This invention relates to the preparation of silica-alumina macrospheres utilizing basic aluminum sulfate as the sole source of the alumina. Silica-alumina macrospheres have heretofore been prepared utilizing a basic aluminum sulfate as the sole source of the alumina portion thereof. In particular, the art disclosed the method whereby a colloidal solution of a basic aluminum sulfate is dissolved in an acidic silica sol and passed through a water-immiscible solvent to form spheroidal hydrogel particles. The method is described in substantial detail in U.S. Pat. No. 3,183,194. Thus, it is shown that a basic aluminum sulfate with an $SO_3/Al_2O_3$ mole ratio of from about 1.6 to about 0.8 is initially dissolved in a silica sol with a pH in the 1–3 range. To obviate the occurrence of cracks in the final product, the hydrogel particles must be transferred from the water-immiscible solvent before softening occurs, and the hydrogel particle must then be extensively water-treated at conditions to hydrolyze the aluminum sulfate and remove sufficient sulfate to establish an $SO_3/Al_2O_3$ mole ratio in the range of from about 0.4 to about 0.7. Further process steps include a relatively extensive treatment with an alkaline solution capable of effecting a gradual and uniform neutralization of the hydrogel particles, and a final alkaline wash before calcination.

It is an object of this invention to present an improved method of manufacturing silica-alumina macrospheres wherein a basic aluminum sulfate is sole source of alumina. The method of the present invention permits a substantially less extensive water treatment of the hydrogel spheres as well as substantially less extensive alkaline treatment.

In one of its broad aspects, the present invention embodies a method of manufacturing spheroidal silica-alumina particles which comprises forming a stable suspension of an insoluble basic aluminum sulfate in an acidic silica sol by commingling a basic aluminum sulfate characterized by an $SO_3/Al_2O_3$ mole ratio of from about 0.60 to about 0.40 and a particle size of from about 1 to about 10 microns with a silica sol characterized by a pH of from about 1 to about 3; dispersing the suspension as droplets in a hot, water-immiscible suspending media, and retaining the droplets therein until they set to firm hydrogel particles; aging the hydrogel particles in an aqueous alkaline solution; and thereafter washing, drying and calcining the particles.

Other objects and embodiments of this invention will become apparent in the following detailed specification.

The basic aluminum sulfate of this invention is characterized by an $SO_3/Al_2O_3$ mole ratio of from about 0.60 to about 0.40. Said basic aluminum sulfate has heretofore been prepared by admixing an aqueous aluminum sulfate solution with an aqueous ammonium hydroxide solution at conditions to form a common solution with a pH of from about 5.5 to about 6.5. The basic aluminum sulfate which precipitates from the solution is a readily filterable material and, when air dried, has a particle size in the 1–10 micron range. It has been found that sufficient of the basic aluminum sulfate can be maintained as a stable suspension in the hereinafter described silica sol to provide a final silica-alumina product comprising up to about 60 wt. percent alumina.

The aforementioned acidic silica sol is obtainable by several alternative procedures. For example, a suitable mineral acid such as hydrochloric acid, sulfuric acid, etc., is added to an aqueous alkali metal silicate solution, generally an aqueous sodium silicate solution commonly referred to as water glass. Preferably, the order of addition is reversed, the water glass being added to the acid. The latter technique is preferred since the formation of the silica sol always occurs under acid conditions which preclude the premature gelation of the sol. When using sulfuric or hydrochloric acids, concentrations in the 10–30 percent range are satisfactory, and the sodium silicate solution, or water glass, is first diluted with water to establish a silica concentration in the range of from about 5 to about 16 wt. percent. The water glass is admixed with the acid at a temperature of less than about 35° C. and with agitation to inhibit polymerization of the resulting silicic acid and premature gelation. At this stage, the silica sol will have a pH in the range of from about 1 to about 3, and the aforesaid basic aluminum sulfate may be commingled therewith to form a stable suspension.

Pursuant to the present invention, the suspension comprising a basic aluminum sulfate and an acidic silica sol is dispersed as droplets in a hot, water-immiscible suspending media and the droplets retained therein until they set to firm hydrogel particles. The aforesaid method, commonly referred to as the oil-drop method, provides for the passage of the droplets through the water-immiscible suspending media — usually a light gas oil chosen principally for its high interfacial tension with respect to water. Passage of the droplets through the suspending media produces two effects. First, as each droplet penetrates the surface it draws into a spherical shape. The droplets are principally water at this stage, and being insoluble in the oil, they tend to draw into a shape resulting in the least surface area for their volume. The second effect is that the formed spheres are given time to gel and build an initial structure while gravitating to the bottom of the suspending media so that sufficient structural stability is established to resist the strains imposed by the transfer and subsequent treatment of the spheroidal particles.

In accordance with the method of this invention, the spheroidal hydrogel particles are transferred from the water-immiscible suspending media to an aqueous alkaline aging solution, suitably an aqueous ammoniacal solution. The spheres are retained in the aging solution for a relatively brief period permitting substantially complete hydrolysis of the residual basic aluminum sulfate content thereof. Preferably, the spheres are retained in the aging solution for a period of from about ½ to about 2 hours at a temperature at from about 50° to about 105° C. It will be appreciated that the relatively low $SO_3/Al_2O_3$ mole ratio of the basic aluminum sulfate starting material will permit a substantially less tedious washing process for the separation of sulfate from the spheroidal hydrogel product. Thus, the aged spheres are washed with an aqueous alkaline solution followed by a water-wash, suitably at room temperature, to reduce the sulfate content thereof, preferably at less than about 0.5 wt. percent. The spheres may be washed in any suitable manner. A particularly suitable method is to wash the spheres by percolation, either with an upward or downward flow of water, or aqueous alkaline solution as the case may be. After washing, the spheres may be dried at a temperature up to about 325°

C., or dried at this temperature and then calcined or oxidized at a temperature of from about 425° to about 750° C. for 2 to 12 hours or more, and then utilized as such or composited with other catalytic components.

The silica-alumina spheroidal particles prepared according to the method of this invention may be composited with any of the several catalytically active metallic materials in the oxidized or reduced state. Of particular interest are those catalytic composites comprising one or more metals of Groups VIB and VIII including molybdenum, tungsten, chromium, iron, nickel, cobalt, platinum, palladium, ruthenium, rhodium, osmium and iridium. Thus, silica-alumina spheres prepared in accordance with the method of this invention can be utilized advantageously as a catalyst or component thereof to effect a variety of hydrogen conversion reactions involving reaction conditions comprising a temperature in the 25°–750° C. range. The catalysts are particularly useful in effecting the hydrocracking of heavy oils, including vacuum residuals, to form petroleum products in the middle distillate range utilizing a temperature of from about 250° to about 1500° C. and pressures of from about 500 to about 1000 psig. Said hydrocarbon conversion reactions further include the polymerization of olefins, particularly ethylene, propylene, 1-butene, 2-butene, isobutylene and also higher boiling olefins, at polymerization reaction conditions. The silica-alumina product is also useful as a catalyst or component thereof in effecting the alkylation of isoparaffins with olefins or other alkylating agents including, for example, alkyl halides and the like; and also the alkylation of isobutane, isopentane, and/or isohexane with ethylene, propylene, 1-butene, etc., or mixtures thereof; and also the alkylation of aromatics with olefins or other alkylating agents, particularly the alkylation of benzene, toluene, etc., with propylene, butylene and higher boiling olefins including nonenes, decenes, undecenes, etc., the foregoing alkylation reaction being effective at alkylation conditions disclosed in the art. The products of this invention are further useful in the isomerization of paraffins, particularly n-butane, n-pentane, n-hexane, n-heptane, n-octane, etc., or mixtures thereof, including the isomerization of less highly branched chain saturated hydrocarbons to more highly branched chain saturated hydrocarbons such as the isomerization of 2- or 3-methylpentane to 2,3- and 2,2-dimethylbutane; isomerization of naphthenes, for example, the isomerization of dimethylcyclopentane to methylcyclohexane, isomerization of methylcyclopentane to cyclohexane, etc., at isomerization reaction conditions. Other hydrocarbon conversion reactions including hydrocarbon transfer reactions, alkyl transfer reactions, transalkylation reactions, and the reforming of gasoline or naphtha to improve the antiknock characteristics thereof, are effectively catalyzed utilizing the silica-alumina spheroidal product of this invention as a catalyst or component thereof.

From the foregoing description it is apparent that a preferred embodiment of this invention for the manufacture of silica-alumina macrospheres comprises forming a stable suspension of a basic aluminum sulfate in an acidic silica sol by commingling a basic aluminum sulfate characterized by an $SO_3/Al_2O_3$ mole ratio of from about 0.6 to about 0.4 and a particle size of from about 1 to about 10 microns with a silica sol characterized by a pH of from about 1 to about 3, said basic aluminum sulfate being utilized in an amount to provide a silica-alumina product comprising up to about 60 wt. percent alumina; dispersing the suspension as droplets in an oil bath maintained at a temperature of from about 50° to about 105° C., and retaining the droplets therein until they set to firm hydrogel particles; aging the hydrogel particles in an aqueous ammoniacal solution at a temperature of from about 50° to about 105° C.; washing the aged particles with an aqueous ammoniacal solution at about room temperature, and then water-washing the particles to reduce the sulfate content thereof to less than about 0.5 wt. percent; and thereafter drying and calcining said particles at a temperature of from about 425° to about 750° C. in an oxidizing atmosphere.

The following example is presented in illustration of one preferred embodiment of this invention and is not intended as a limitation on the generally broad scope of the invention as set out in the appended claims.

EXAMPLE

This example demonstrates the preparation of the spheroidal silica-alumina particles according to one preferred embodiment of this invention, said particles comprising silica and alumina in a 60/40 weight ratio. A basic aluminum sulfate was prepared by admixing about 500 cc of water with 3 cc of a 28 percent aqueous aluminum sulfate solution. The pH of the solution was then adjusted to about 6 by the addition thereto of a 15 percent aqueous ammonium hydroxide solution. Thereafter, the pH of the solution was maintained at this level by the concurrent addition of a 28 percent aqueous aluminum sulfate solution and a 15 percent aqueous ammonium hydroxide solution thereto, and addition being at a rate to provide about 1.7 volumes of aluminum sulfate solution per volume of ammonium hydroxide solution. The resulting basic aluminum sulfate precipitate was filtered, washed free of soluble sulfate, and reslurried to 13.5 percent $Al_2O_3$ equivalent concentration (7.2 percent Al, 5.6 percent $SO_4$). About 300 grams of the basic aluminum sulfate slurry was added to 435 cc of an acidic silica sol at 7° C. to form a stable suspension. The silica sol was prepared by the acidification of 315 cc of 16 wt. percent glass solution with 120 cc of a 20 percent hydrochloric acid solution. Silica-alumina hydrogel spheres were formed by the described oil-drop method at 95° C. The hydrogel spheres were aged for about ½ hour at 95° C. in 750 cc of a 5 percent aqueous ammoniacal solution, washed for about 15 minutes at room temperature with 700 cc of an aqueous ammoniacal solution containing 50 cc of a 28 percent ammonium hydroxide solution, and finally water-washed. After three 15 minute water-washings with 750 cc of water each, the sulfate level was reduced to 0.3 wt. percent. The spheres were subsequently dried and calcined in air at 650° C. for 2 hours. The silica-alumina product consisted of ⅛ inch spheres with an average bulk density of 0.60 grams per cc.

I claim as my invention:

1. A method of manufacturing spheroidal silica-alumina particles which comprises:
    a. precipitating basic aluminum sulfate from a common aqueous solution of aluminum sulfate and ammonium hydroxide having a pH of from about 5.5 to about 6.5, the precipitated basic aluminum sulfate having an $SO_3/Al_2O_3$ mole ratio of from about 0.6 to about 0.4 and a particle size of from about 1 to about 10 microns;

b. suspending said precipitated basic aluminum sulfate in a silica sol having a pH of from about 1 to about 3;
c. dispersing the resultant suspension as droplets in a hot, water-immiscible, suspending media, and retaining the droplets therein until they set to firm hydrogel particles;
d. aging the hydrogel particles for a period of from about ½ to about 2 hours at a temperature of from about 50° C to about 105° C in an aqueous alkaline solution; and
e. thereafter washing and drying the aged particles and then calcining the same in an oxidizing atmosphere at a temperature of from about 425° to about 750° C.

2. The method of claim 1 further characterized in that said basic aluminum sulfate is utilized in an amount to provide a silica-alumina product comprising up to about 60 wt. percent alumina.

3. The method of claim 1 further characterized in that said aqueous alkaline solution is an aqueous ammoniacal solution.

4. The method of claim 1 further characterized in that said suspension is dispersed as droplets in an oil bath maintained at a temperature of from about 50° to about 105° C.

5. The method of claim 1 further characterized in that said aged hydrogel particles are washed in aqueous ammoniacal solution and then water-washed to reduce the sulfate content thereof to less than about 0.5 wt. percent.

* * * * *